(12) United States Patent
Minami et al.

(10) Patent No.: US 7,029,831 B2
(45) Date of Patent: Apr. 18, 2006

(54) METHOD FOR FABRICATING OPTICAL ELEMENT

(75) Inventors: Tsutomu Minami, 7-1, Oonodai 2-chome, Osakasayama-shi, Osaka 589-0023 (JP); Masahiro Tatsumisago, Sakai (JP); Kiyoharu Tadanaga, Sakai (JP); Atsunori Matsuda, Kawachinagano (JP); Mitsuhiro Kawazu, Osaka (JP); Hiroaki Yamamoto, Osaka (JP); Koichiro Nakamura, Osaka (JP)

(73) Assignees: Nippon Sheet Glass Co., Ltd., Osaka (JP); Tsutomu Minami, Osaka (JP)

( * ) Notice: Subject to any disclaimer, the term of this patent is extended or adjusted under 35 U.S.C. 154(b) by 371 days.

(21) Appl. No.: 10/275,009

(22) PCT Filed: Feb. 26, 2002

(86) PCT No.: PCT/JP02/01738

§ 371 (c)(1),
(2), (4) Date: Oct. 31, 2002

(87) PCT Pub. No.: WO02/070413

PCT Pub. Date: Sep. 12, 2002

(65) Prior Publication Data

US 2003/0124467 A1 Jul. 3, 2003

(30) Foreign Application Priority Data

Mar. 1, 2001 (JP) .............................. 2001-057223
Sep. 21, 2001 (JP) .............................. 2001-288622

(51) Int. Cl.
*G02B 3/00* (2006.01)
*C03B 8/02* (2006.01)
*C03B 19/12* (2006.01)
*C03C 17/37* (2006.01)

(52) U.S. Cl. ..................................................... 430/321
(58) Field of Classification Search ................. 430/321
See application file for complete search history.

(56) References Cited

U.S. PATENT DOCUMENTS 5,378,585 A 1/1995 Watanabe
2002/0027300 A1* 3/2002 Hartmann et al. ........... 264/1.1

FOREIGN PATENT DOCUMENTS

EP 0 932 081 7/1999
EP 0985510 3/2000

(Continued)

OTHER PUBLICATIONS

Hartmann et al, Applied Optics, vol. 40, No. 16, Jun. 1, 2001, pates 2736-2746.*

*Primary Examiner*—Cynthia Hamilton
(74) *Attorney, Agent, or Firm*—Wenderoth, Lind & Ponack, L.L.P.

(57) ABSTRACT

A process for producing an optical element which has excellent heat resistance and adhesion to a substrate. This process comprises applying a liquid composition for forming an optical element to the molding surface of a substrate having a regular pattern surface consisting of areas having high wettability and areas having low wettability as the molding surface and curing the composition to form projections in the areas having high wettability. A solution containing at least one compound selected from the group consisting of a hydrolyzable compound which can be hydrolyzed and polycondensed and a hydrolyzed/polycondensed product thereof is used as the liquid composition for forming an optical element.

45 Claims, 2 Drawing Sheets

FOREIGN PATENT DOCUMENTS

| | | |
|---|---|---|
| JP | 2000-199805 | 7/2000 |
| JP | 2000-227506 | 8/2000 |
| JP | 2001-109091 | 4/2001 |
| WO | 99/08158 | 2/1999 |

* cited by examiner

F I G. 2
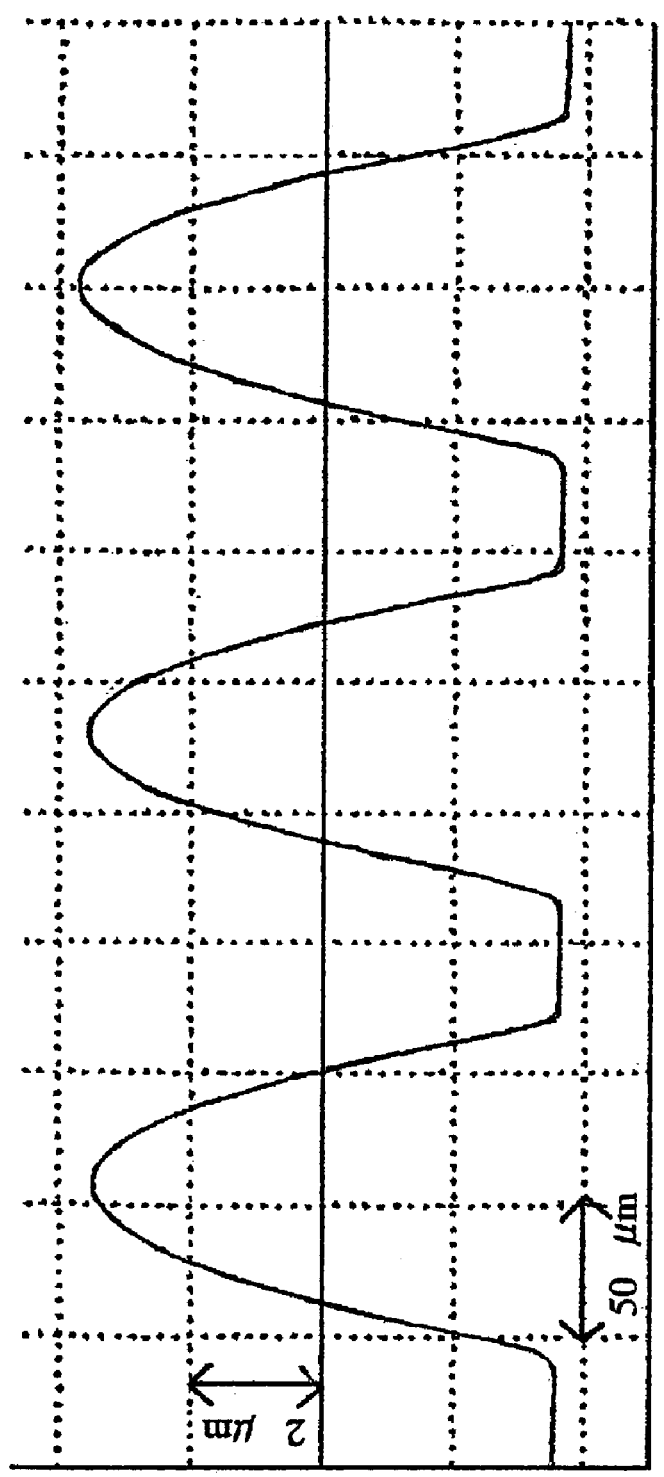

METHOD FOR FABRICATING OPTICAL ELEMENT

FIELD OF THE INVENTION

The present invention relates to a process for producing an optical element. More specifically, it relates to a process for producing an optical element such as a microlens array particularly suitable for use in communication and display making use of liquid crystals and the like.

DESCRIPTION OF THE PRIOR ART

Out of optical elements which have been used so far, a microlens or a microlens array constructed by arranging a plurality of microlenses on a plane regularly in such a manner that their optical axes become parallel to one another have been widely used in the field of fine optics. More and more optical parts for communication are needed due to recent growing demand.

As means of producing the above microlenses, there is known a production process in which a liquid composition for forming an optical element is adhered to the surface of a substrate having a regular pattern surface consisting of areas having high wettability and areas having low wettability and cured to form projections in the areas having high wettability (JP-A 2000-199805 and JP-A 2000-227506) (the term "JP-A" as used herein means an "unexamined published Japanese patent application"). However, since a photocurable resin is used as the liquid composition for forming an optical element, it has low heat resistance and may therefore be discolored by heating. Therefore, the above process has a problem that it is difficult to use it in a portion which requires heat resistance.

SUMMARY OF THE INVENTION

It is an object of the present invention which has solved the above problem to provide a process for producing an optical element which has excellent heat resistance and adhesion to a substrate.

Other objects and advantages of the present invention will become apparent from the following description.

According to the present invention, the above objects and advantages of the present invention are attained by a process for producing an optical element, comprising the steps of:

adhering a liquid composition for- forming an optical element to the molding surface of a substrate having a regular pattern surface consisting of areas having high wettability and areas having low wettability as the molding surface; and curing the composition to form projections in the areas having high wettability, wherein a solution containing at least one compound selected from the group consisting of a hydrolyzable compound which can be hydrolyzed/polycondensed and a hydrolyzed/polycondensed product thereof is used as the liquid composition for forming an optical element.

BRIEF DESCRIPTION OF THE DRAWINGS

FIG. 2 is a graph showing the sectional profile cut at the top of the lens of the microlens array obtained in Example of the present invention.

THE PREFERRED EMBODIMENT OF THE INVENTION

Figure 1:
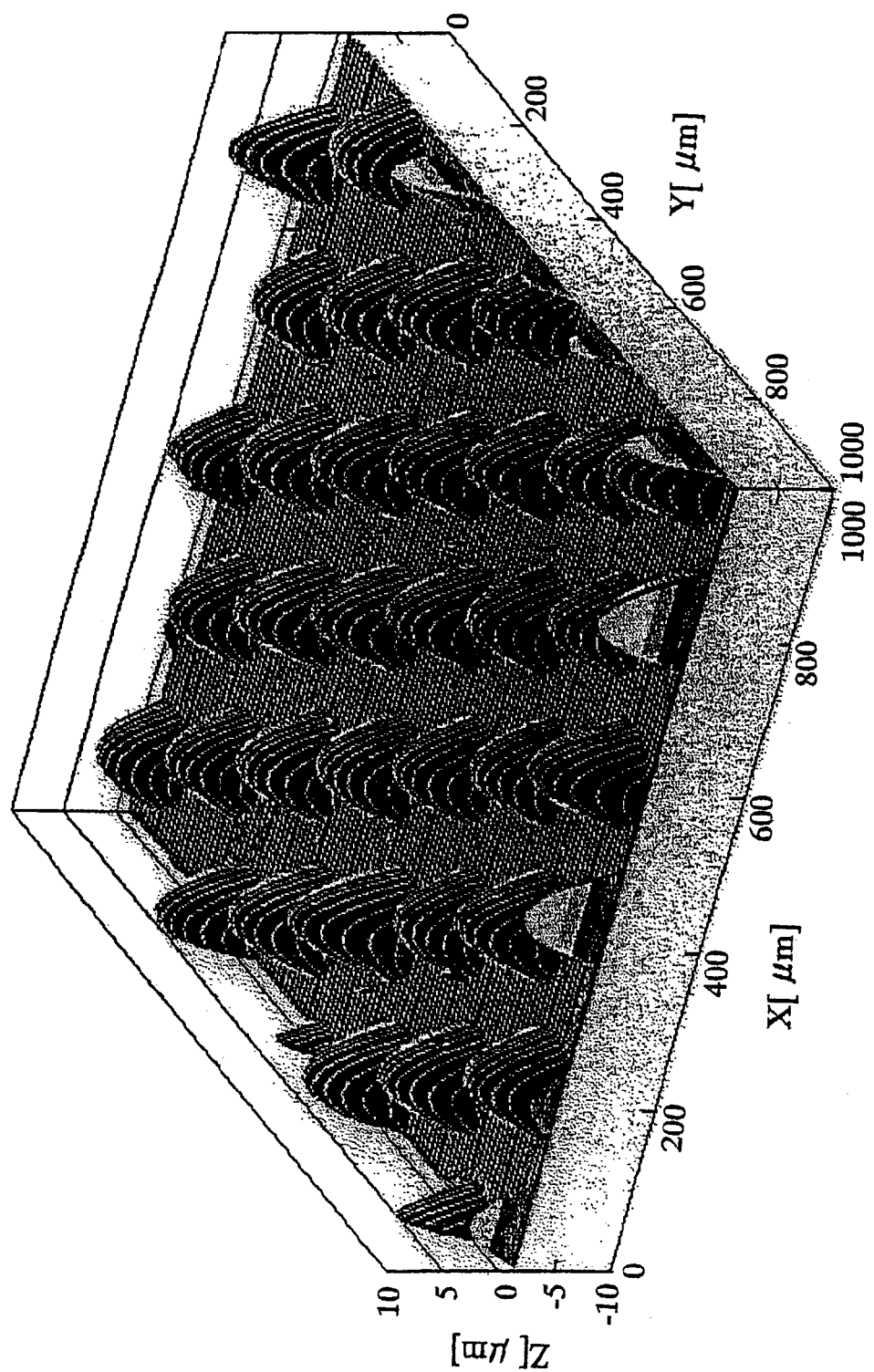
FIG. 1 is a perspective view of the 3-D surface profile of a microlens array obtained in Example of the present invention.

A description is first given of a process for forming a regular pattern consisting of areas having high wettability and areas having low wettability in the surface of a substrate. The areas having high wettability and the areas having low wettability in the surface of the substrate in the present invention refer to portions to which a solution containing a hydrolyzable compound able to be hydrolyzed/polycondensed or a hydrolyzed/polycondensed product thereof, which is the liquid composition for forming an optical element, is adhered relatively easily and portions to which the solution is adhered relatively hardly of the surface of the substrate, respectively. The regular pattern consisting of the areas having high wettability and the areas having low wettability is preferably formed by covering the surface of the substrate with a layer containing a photo catalyst and a material having an organic group which is decomposable by the photo catalytic function to take part in wettability and exposing the layer to light through a photomask to decompose the organic group of the above material in exposed portions by the photo catalytic function in the exposed portions in order to produce a difference between the wettability of the exposed portions and the wettability of the unexposed portions. For instance, when a silane compound having a water-repellent group such as a fluoroalkyl group in the molecule is used as the above material, the exposed portions form areas having high wettability and the unexposed portions form areas having low wettability. Alternatively, the surface of the substrate is covered with a photosensitive resin layer and exposed to light through a photomask, and light exposed portions (or light unexposed portions) are dissolved in a solvent and removed to expose the substrate, thereby producing a difference between the wettability of the substrate itself and the wettability of the residual photosensitive resin which is not dissolved and removed. In this case, the surface of the exposed substrate (glass) obtained by dissolving and removing the light exposed portions (or light unexposed portions) has higher wettability than the surface of the photosensitive resin layer which has not been dissolved or removed.

In the former method, two layers consisting of a first layer of an oxide having photo catalytic activity and a second layer of a compound having an organic group which is decomposed by a photo catalytic function and formed on the first layer may be formed in place of one layer formed on the surface of the substrate containing a photo catalyst and a substance having an organic group which is decomposed by the photo catalytic function. In this case, the second layer preferably has light permeability.

A description is subsequently given of a process for forming a regular pattern consisting of areas having high wettability and areas having low wettability by forming a layer of an oxide having photo catalytic activity and a layer of a compound having an organic group which is decomposed by a photo catalytic function on the surface of a substrate in the mentioned order and exposing the layers to light through a photomask to decompose the organic group of the above material in light exposed portions so as to produce a difference between the wettability of the light exposed portions and the wettability of the light unexposed portions.

The layer of the oxide having photo catalytic activity (may be simply referred to as "photo catalyst layer" hereinafter) is formed from titanium oxide ($TiO_2$), ZnO, $WO_3$, $Fe_2O_3$, $SrTiO_3$, $In_2O_3$, $MoO_2$ or $TiO_2$—Pt—$RuO_2$ by an ordinary thin film forming method, that is, vacuum deposition method, chemical vapor deposition method, sol-gel method or fine particle baking method as a thin film having a thickness of preferably 10 to 200 nm. A titanium oxide ($TiO_2$) film which is the most widely used today can be formed as a titanium oxide crystalline thin film, for example, anatase type titanium oxide thin film by the vacuum deposition method. When the chemical vapor decomposition method or sol-gel method is used, a heat treatment for crystallizing the initially formed amorphous titanium oxide thin film is required. This heat treatment for crystallization is preferably carried out at 450 to 550° C. for 10 minutes to 2 hours.

Besides the above production methods, the titanium oxide film can be obtained by applying commercially available fine particles in the form of water dispersion sol having photo catalytic activity such as the photo catalyst titanium oxide fine particles (trade name: STS-01 (particle diameter (X-ray particle diameter) of 7 nm), STS-02 (particle diameter (X-ray particle diameter) of 7 nm) and CS-N) of Ishihara Sangyo Co., Ltd., the M-6 titania sol of Taki Kagaku Co., Ltd. (crystal size of 5 nm) or a commercially available titania sol dispersed in an alcohol-water mixed solvent containing a binder such as the ST-K01 or ST-K03 of Ishihara Sangyo Co., Ltd. in a liquid form and drying the coating film.

Titanium organic compounds such as a titanium alkoxide, titanium acetylacetonate and titanium carboxylate are preferably used as the raw material of a titanium oxide crystalline thin film formed by the sol-gel method. The titanium alkoxide is generally represented by $Ti(OR)_4$ (R is an alkyl having 1 to 4 carbon atoms) and preferably titanium isopropoxide or titanium butoxide in consideration of reactivity. It has been known that the titanium acetylacetonate is preferred as titanium from the viewpoint of stability. The titanium acetylacetonate is represented by $Ti(OR)_mL_n$ (m+n=4, n≠0, L is acetylacetone). In this case, a titanium alkoxide may be acetylacetonated by acetylacetone, or a commercially available titanium acetylacetonate may be used. Further, the titanium carboxylate may be used. A solution containing a titanium organic compound and an acid catalyst is applied to the surface of the substrate and heated to form a photo catalyst layer of titanium oxide on the surface of the substrate.

Thereafter, a light transmitting layer containing a compound which is decomposed by a photo catalystic function to change its wettability, particularly a compound having an organic group which is decomposed by a photo catalystic function, for example, a water-repellent group is formed on the optical catalyst layer by the sol-gel method, vacuum deposition method or vapor deposition method. This layer has a thickness of preferably 1 to 100 nm, more preferably 1 to 50 nm.

The compound having a water-repellent group is preferably a silane compound having a water-repellent group. Specifically, the compound is a silane compound having 1 or more water-repellent groups, for example, alkyl groups or fluoroalkyl groups in the molecule.

Examples of the silane compound having an alkyl group(s) include alkyl group-containing chlorosilanes such as $CH_3(CH_2)_{30}SiCl_3$, $CH_3(CH_2)_{20}SiCl_3$, $CH_3(CH_2)_{18}SiCl_3$, $CH_3(CH_2)_{16}SiCl_3$, $CH_3(CH_2)_{14}SiCl_3$, $CH_3(CH_2)_{12}SiCl_3$, $CH_3(CH_2)_{10}SiCl_3$, $CH_3(CH_2)_9SiCl_3$, $CH_3(CH_2)_8SiCl_3$, $CH_3(CH_2)_7SiCl_3$, $CH_3(CH_2)_6SiCl_3$, $CH_3(CH_2)_5SiCl_3$, $CH_3(CH_2)_4SiCl_3$, $CH_3(CH_2)_3SiCl_3$, $CH_3(CH_2)_2SiCl_3$, $CH_3CH_2SiCl_3$, $(CH_3CH_2)_2SiCl_2$, $(CH_3CH_2)_3SiCl$, $CH_3SiCl_3$, $(CH_3)_2SiCl_2$ and $(CH_3)_3SiCl$; alkyl group-containing alkoxysilanes such as $CH_3(CH_2)_{30}Si(OCH_3)_3$, $CH_3(CH_2)_{20}Si(OCH_3)_3$, $CH_3(CH_2)_{18}Si(OCH_3)_3$, $CH_3(CH_2)_{16}Si(OCH_3)_3$, $CH_3(CH_2)_{14}Si(OCH_3)_3$, $CH_3(CH_2)_{12}Si(OCH_3)_3$, $CH_3(CH_2)_{10}Si(OCH_3)_3$, $CH_3(CH_2)_9Si(OCH_3)_3$, $CH_3(CH_2)_8Si(OCH_3)_3$, $CH_3(CH_2)_7Si(OCH_3)_3$, $CH_3(CH_2)_6Si(OCH_3)_3$, $CH_3(CH_2)_5Si(OCH_3)_3$, $CH_3(CH_2)_4Si(OCH_3)_3$, $CH_3(CH_2)_3Si(OCH_3)_3$, $CH_3(CH_2)_2Si(OCH_3)_3$, $CH_3CH_2Si(OCH_3)_3$, $(CH_3CH_2)_2Si(OCH_3)_2$, $(CH_3CH_2)_3SiOCH_3$, $CH_3Si(OCH_3)_3$, $(CH_3)_2Si(OCH_3)_2$, $(CH_3)_3SiOCH_3$, $CH_3(CH_2)_{30}Si(OC_2H_5)_3$, $CH_3(CH_2)_{20}Si(OC_2H_5)_3$, $CH_3(CH_2)_{18}Si(OC_2H_5)_3$, $CH_3(CH_2)_{16}Si(OC_2H_5)_3$, $CH_3(CH_2)_{14}Si(OC_2H_5)_3$, $CH_3(CH_2)_{12}Si(OC_2H_5)_3$, $CH_3(CH_2)_{10}Si(OC_2H_5)_3$, $CH_3(CH_2)_9Si(OC_2H_5)_3$, $CH_3(CH_2)_8Si(OC_2H_5)_3$, $CH_3(CH_2)_7Si(OC_2H_5)_3$, $CH_3(CH_2)_6Si(OC_2H_5)_3$, $CH_3(CH_2)_5Si(OC_2H_5)_3$, $CH_3(CH_2)_4Si(OC_2H_5)_3$, $CH_3(CH_2)_3Si(OC_2H_5)_3$, $CH_3(CH_2)_2Si(OC_2H_5)_3$, $CH_3CH_2Si(OC_2H_5)_3$, $(CH_3CH_2)_2Si(OC_2H_5)_2$, $(CH_3CH_2)_3SiOC_2H_5$, $CH_3Si(OC_2H_5)_3$, $(CH_3)_2Si(OC_2H_5)_2$ and $(CH_3)_3SiOC_2H_5$; alkyl group-containing acyloxysilanes such as $CH_3(CH_2)_{30}Si(OCOCH_3)_3$, $CH_3(CH_2)_{20}Si(OCOCH_3)_3$, $CH_3(CH_2)_{18}Si(OCOCH_3)_3$, $CH_3(CH_2)_{16}Si(OCOCH_3)_3$, $CH_3(CH_2)_{14}Si(OCOCH_3)_3$, $CH_3(CH_2)_{12}Si(OCOCH_3)_3$, $CH_3(CH_2)_{10}Si(OCOCH_3)_3$, $CH_3(CH_2)_9Si(OCOCH_3)_3$, $CH_3(CH_2)_8Si(OCOCH_3)_3$, $CH_3(CH_2)_7Si(OCOCH_3)_3$, $CH_3(CH_2)_6Si(OCOCH_3)_3$, $CH_3(CH_2)_5Si(OCOCH_3)_3$, $CH_3(CH_2)_4Si(OCOCH_3)_3$, $CH_3(CH_2)_3Si(OCOCH_3)_3$, $CH_3(CH_2)_2Si(OCOCH_3)_3$, $CH_3CH_2Si(OCOCH_3)_3$, $(CH_3CH_2)_2Si(OCOCH_3)_2$, $(CH_3CH_2)_3SiOCOCH_3$, $CH_3Si(OCOCH_3)_3$, $(CH_3)_2Si(OCOCH_3)_2$ and $(CH_3)_3SiOCOCH_3$; and alkyl group-containing isocyanatesilanes such as $CH_3(CH_2)_{30}Si(NCO)_3$, $CH_3(CH_2)_{20}Si(NCO)_3$, $CH_3(CH_2)_{18}Si(NCO)_3$, $CH_3(CH_2)_{16}Si(NCO)_3$, $CH_3(CH_2)_{14}Si(NCO)_3$, $CH_3(CH_2)_{12}Si(NCO)_3$, $CH_3(CH_2)_{10}Si(NCO)_3$, $CH_3(CH_2)_9Si(NCO)_3$, $CH_3(CH_2)_8Si(NCO)_3$, $CH_3(CH_2)_7Si(NCO)_3$, $CH_3(CH_2)_6Si(NCO)_3$, $CH_3(CH_2)_5Si(NCO)_3$, $CH_3(CH_2)_4Si(NCO)_3$, $CH_3(CH_2)_3Si(NCO)_3$, $CH_3(CH_2)_2Si(NCO)_3$, $CH_3CH_2Si(NCO)_3$, $(CH_3CH_2)_2Si(NCO)_2$, $(CH_3CH_2)_3SiNCO$, $CH_3Si(NCO)_3$, $(CH_3)_2Si(NCO)_2$ and $(CH_3)_3SiNCO$.

Examples of the silane compound having a fluoroalkyl group(s) include fluoroalkyl group-containing trichlorosilanes such as $CF_3(CF_2)_{11}(CH_2)_2SiCl_3$, $CF_3(CF_2)_{10}(CH_2)_2SiCl_3$, $CF_3(CF_2)_9(CH_2)_2SiCl_3$, $CF_3(CF_2)_8(CH_2)_2SiCl_3$, $CF_3(CF_2)_7(CH_2)_2SiCl_3$, $CF_3(CF_2)_6(CH_2)_2SiCl_3$, $CF_3(CF_2)_5(CH_2)_2SiCl_3$, $CF_3(CF_2)_4(CH_2)_2SiCl_3$, $CF_3(CF_2)_3(CH_2)_2SiCl_3$, $CF_3(CF_2)_2(CH_2)_2SiCl_3$, $CF_3CF_2(CH_2)_2SiCl_3$ and $CF_3(CH_2)_2SiCl_3$; fluoroalkyl group-containing trialkoxysilanes such as $CF_3(CF_2)_{11}(CH_2)_2Si(OCH_3)_3$, $CF_3(CF_2)_{10}(CH_2)_2Si(OCH_3)_3$, $CF_3(CF_2)_9(CH_2)_2Si(OCH_3)_3$, $CF_3(CF_2)_8(CH_2)_2Si(OCH_3)_3$, $CF_3(CF_2)_7(CH_2)_2Si(OCH_3)_3$, $CF_3(CF_2)_6(CH_2)_2Si(OCH_3)_3$, $CF_3(CF_2)_5(CH_2)_2Si(OCH_3)_3$, $CF_3(CF_2)_4(CH_2)_2Si(OCH_3)_3$, $CF_3(CF_2)_3(CH_2)_2Si(OCH_3)_3$, $CF_3(CF_2)_2(CH_2)_2Si(OCH_3)_3$, $CF_3CF_2(CH_2)_2Si(OCH_3)_3$, $CF_3(CH_2)_2Si(OCH_3)_3$, $CF_3(CF_2)_{11}(CH_2)_2Si(OC_2H_5)_3$, $CF_3(CF_2)_{10}(CH_2)_2Si(OC_2H_5)_3$, $CF_3(CF_2)_9(CH_2)_2Si(OC_2H_5)_3$, $CF_3(CF_2)_8(CH_2)_2Si(OC_2H_5)_3$, $CF_3(CF_2)_7(CH_2)_2Si(OC_2H_5)_3$, $CF_3(CF_2)_6(CH_2)_2Si(OC_2H_5)_3$, $CF_3(CF_2)_5(CH_2)_2Si(OC_2H_5)_3$, $CF_3(CF_2)_4(CH_2)_2Si(OC_2H_5)_3$, $CF_3(CF_2)_3(CH_2)_2Si(OC_2H_5)_3$, $CF_3(CF_2)_2(CH_2)_2Si(OC_2H_5)_3$, $CF_3CF_2(CH_2)_2Si(OC_2H_5)_3$ and $CF_3(CH_2)_2Si(OC_2H_5)_3$; fluoroalkyl group-containing triacyloxysilanes such as $CF_3(CF_2)_{11}(CH_2)_2Si(OCOCH_3)_3$, $CF_3(CF_2)_{10}(CH_2)_2Si(OCOCH_3)_3$, $CF_3(CF_2)_9(CH_2)_2Si(OCOCH_3)_3$, $CF_3(CF_2)_8(CH_2)_2Si(OCOCH_3)_3$, $CF_3(CF_2)_7(CH_2)_2Si(OCOCH_3)_3$, $CF_3(CF_2)_6(CH_2)_2Si(OCOCH_3)_3$, $CF_3(CF_2)_5(CH_2)_2Si(OCOCH_3)_3$, $CF_3(CF_2)_4(CH_2)_2Si(OCOCH_3)_3$, $CF_3(CF_2)_3(CH_2)_2Si(OCOCH_3)_3$, $CF_3(CF_2)_2(CH_2)_2Si(OCOCH_3)_3$, $CF_3CF_2(CH_2)_2Si(OCOCH_3)_3$ and $CF_3(CH_2)_2Si(OCOCH_3)_3$; and fluoroalkyl group-containing triisocyanatesilanes such as $CF_3(CF_2)_{11}(CH_2)_2Si(NCO)_3$, $CF_3(CF_2)_{10}(CH_2)_2Si(NCO)_3$, $CF_3(CF_2)_9(CH_2)_2Si(NCO)_3$, $CF_3(CF_2)_8(CH_2)_2Si(NCO)_3$, $CF_3(CF_2)_7(CH_2)_2Si(NCO)_3$, $CF_3(CF_2)_6(CH_2)_2Si(NCO)_3$, $CF_3(CF_2)_5(CH_2)_2Si(NCO)_3$, $CF_3(CF_2)_4(CH_2)_2Si(NCO)_3$, $CF_3(CF_2)_3(CH_2)_2Si(NCO)_3$, $CF_3(CF_2)_2(CH_2)_2Si(NCO)_3$, $CF_3CF_2(CH_2)_2Si(NCO)_3$ and $CF_3(CH_2)_2Si(NCO)_3$.

Out of these, trialkoxysilanes having a fluoroalkyl group(s) are preferred and fluoroalkyl trimethoxysilanes and fluoroalkyl triethoxysilanes having 13 to 22 fluorine atoms are particularly preferred.

A photomask having a regular pattern consisting of light transmitting areas and light blocking areas is placed on the substrate covered with a photo catalyst layer and a light transmitting layer of a compound which is decomposed by a photo catalytic function to change its wettability in the mentioned order. The light transmitting areas or light blocking areas may be square, circular, oval or hexagonal having a diameter of 10 to 500 µm and preferably correspond to the shape of the bottom of an optical element to be formed. When the above compound layer is made from a compound having a water-repellent group(s), the light transmitting areas preferably have the above shape and when the above compound layer is made from a compound which is decomposed by a photo catalytic function to reduce its wettability, the light blocking areas preferably have the above shape.

Light Exposure is carried out through this photomask. The photo catalytic activity of titanium oxide is exhibited by exposure to light passing through the above light transmitting layer of the compound to form a regular pattern structure consisting of periodical existence of light exposed areas and light unexposed areas which differ from each other in surface energy. Any radiation may be used for this exposure if the oxide (for example, titanium oxide) having photo catalytic activity contained in the photo catalyst layer exhibits photo catalytic activity. It is preferably ultraviolet radiation having an excitation wavelength of 380 nm or less. The light source emitting such ultraviolet radiation is preferably a mercury lamp, metal halide lamp, xenon lamp, excimer laser, YAG laser (third harmonics and fourth harmonics), He—Gd laser or the like.

The wettability of the compound layer exposed to light through the light transmitting areas of the photomask is changed by the function of the underlying photo catalyst layer. For example, when the above compound layer is made from an alkoxysilane having a water-repellent group such as a fluoroalkyl group, or a hydrolyzate or polycondensate thereof, the fluoroalkyl group in the exposed portions is decomposed by the function of the photo catalyst and the water repellency of the portions is lost with the result that the exposed portions have higher wettability than the unexposed portions. The unexposed portions retain low wettability because they do not lose a water-repellent group. Thus when the compound layer is made from a compound having a water-repellent group, a regular pattern structure consisting of areas having relatively high wettability and areas having relatively low wettability corresponding respectively to the light transmitting portions and the light blocking portions of the photomask is formed in the surface of the above substrate.

Subsequently, a solution containing at least one compound selected from the group consisting of a hydrolyzable compound which can be hydrolyzed and polycondensed and a hydrolyzed/polycondensed product thereof and used as the liquid composition for forming an optical element is applied to the surface of the substrate having this pattern structure. Examples of the hydrolyzable compound which can be hydrolyzed and polycondensed include silicon alkoxides, metal alkoxides and metal chelates.

The alkoxides include methoxides, ethoxides, propoxides and butoxides of silicon (Si), aluminum (Al), zirconium (Zr), titanium (Ti), tin (Sn) and antimony (Sb) which may be used alone or in combination. For example, silicon alkoxides include tetraethoxysilane, tetramethoxysilane, phenyltriethoxysilane and methyltriethoxysilane. Acetylacetonate complexes, ethyl acetoacetate complexes and benzoylacetonate complexes of silicon, aluminum, zirconium, titanium, tin and antimony are preferred as the chelates.

Out of these, silicon compounds represented by the following formula (1) are preferred:

$$Y_nSiX_{4-n} \tag{1}$$

wherein Y is an alkyl group, vinyl group, amino group, epoxy group, phenyl group or benzyl group, X is a halogen or alkoxyl group, and n is 0 or 1.

The alkyl group represented by Y in the above formula (1) is preferably a linear or branched alkyl group such as methyl group, ethyl group, propyl group, butyl group, 2-ethylbutyl group or octyl group, or a cycloalkyl group such as cyclopentyl group or cyclohexyl group. Out of the silicon compounds, organic compounds of the formula (1) in which Y is a phenyl group or benzyl group, X is a methoxyl group or ethoxyl group and n is 1 are more preferred, as exemplified by phenyltrimethoxysilane, phenyltriethoxysilane, benzyltrimethoxysilane and benzyltriethoxysilane. Out of these, phenyltriethoxysilane is particularly preferred.

The silicon compounds represented by the above formula (1) or hydrolyzed/polycondensed products thereof may be used in combination of two or more. When phenyltriethoxysilane is used alone as the hydrolyzable compound which can be hydrolyzed and polycondensed and is a liquid composition for forming an optical element, an optical element having a refractive index of about 1.53 is obtained and when phenyltriethoxysilane and methyltriethoxysilane are used in combination, an optical element having a refractive index of 1.48 to 1.53 is obtained. The refractive index of the obtained optical element can be precisely controlled by adjusting the mixing ratio of phenyltriethoxysilane and methyltriethoxysilane.

A silicon compound represented by the above formula (1) may be used in combination with at least one metal compound selected from the group consisting of titanium alkoxide, zirconium alkoxide, aluminum alkoxide and chelate compounds thereof. For example, by using a metal compound whose oxide has a higher refractive index than silicon oxide, such as a metal alkoxide compound exemplified by tetra-n-buthoxytitanium, tributhoxyaluminum and tetrabuthoxyzirconium, or a titanium-acetylacetonate complex in combination with a silicon compound represented by the above formula (1), the refractive index of an optical element to be formed can be controlled. If the metal compound is used excessively, the liquid composition for forming an optical element will hardly become fluid when it turns into droplets. Therefore, the amount of the at least one metal compound in terms of metal element is preferably 30 mol % or less, more preferably 3 to 20 mol % based on 100 mol % of the total of silicon element and metal element contained in the liquid composition for forming an optical element.

The silicon compound represented by the above formula (1) may be used in combination with a silicon compound (to be referred to as "silicon compound of the formula (2)" hereinafter) represented by the following formula (2):

$$R_2SiQ_2 \tag{2}$$

wherein R's are each independently an alkyl group, vinyl group, amino group, epoxy group, phenyl group or benzyl group and Q's are each independently a halogen or alkoxyl group.

Particularly a silicon compound of the formula (2) in which R is a phenyl group or methyl group, and Q is a methoxyl group or ethoxyl group is preferably used. This improves the fluidity of the liquid composition for forming an optical element when it turns into droplets. When a metal compound having a higher refractive index than silicon oxide is used as described above, the above phenomenon that the liquid composition for forming an optical element hardly becomes fluid when the metal compound having a high refractive index is used excessively can be prevented by using a silicon compound of the formula (2).

Although the silicon compound of the formula (2) is a compound which can be hydrolyzed and polycondensed, it cannot form a network structure by itself. When its content is too high, the mechanical strength of the obtained optical element becomes low. Therefore, the amount of the silicon compound of the formula (2) is preferably 50 mol % or less, more preferably 3 to 40 mol % in terms of silicon element based on 100 mol % of the total of all the elements such as silicon and titanium contained in the liquid composition for forming an optical element.

The liquid composition for forming an optical element comprises a hydrolyzable compound which can be hydrolyzed and polycondensed (for example, a silicon alkoxide), water, an acid catalyst and a solvent. A silane having an increased degree of polymerization is obtained by adding water to the silicon alkoxide by hydrolyzed and polycondensed. The catalyst used at this point is an inorganic acid such as hydrochloric acid, nitric acid or sulfuric acid, or an organic acid such as acetic acid, oxalic acid, formic acid, propionic acid or p-toluenesulfonic acid. The amount of the acid catalyst is preferably 3 to 200 mmols, more preferably 10 to 100 mmols based on 1 mol of the silicon alkoxide.

Water is preferably added more than its stoichiometric amount required for hydrolysis. When the amount of water is smaller than the stoichiometric amount, an unreacted silicon alkoxide readily volatilizes at the time of drying for gelation. In general, the amount of water including water contained in the aqueous solution of the catalyst is 1.1 to 30 times the required stoichiometric amount, or preferably 1.5 to 20 times, more preferably 2 to 10 times the molar amount of the silicon alkoxide.

The solvent (organic solvent) used in the present invention depends on a film forming technique. Casting, dip coating, spin coating, gravure coating, flexographic printing, roll coating, spraying and brush coating are preferably used. The organic solvent used incasting and dip coating out of these is preferably a solvent having a high evaporation speed. When the evaporation speed of the solvent is too low, the drying of the coating film is slow, thereby the fluidity of the liquid becomes high, and a uniform wet coating film may not be formed. Therefore, an alcohol-based solvent having high evaporation speed such as methanol, ethanol, isopropyl alcohol or tert-butoxy alcohol can be advantageously used. The organic solvent used in gravure coating, flexographic printing and roll coating is preferably a solvent having low evaporation speed. This is because when a solvent having high evaporation speed is used, the solvent evaporates before leveling is completed with the result that the finally obtained optical element may become nonuniform in height.

The evaporation speed of the solvent is generally evaluated by relative evaporation speed index when the evaporation speed of butyl acetate is 100. Solvents having a relative evaporation speed index of 40 or less are classified as solvents having extremely low evaporation speed. The above solvents are preferred as an organic solvent used in gravure coating, flexographic printing and roll coating. The solvents include ethyl cellosolve, butyl cellosolve, cellosolve acetate, diethylene glycol monoethyl ether, hexylene glycol, diethylene glycol, ethylene glycol, tripropylene glycol, diacetone alcohol and tetrahydrofurfuryl alcohol.

The coating solution used in the present invention desirably contains at least one of the above solvents and may contain a mixture of two or more of the above solvents depending on a coating technique and the characteristic properties of a coating solution. The amount of the solvent used is preferably 0.3 to 5 times, more preferably 0.5 to 3 times the molar amount of the silicon alkoxide.

The liquid composition for forming an optical element is applied to the surface of a substrate having a pattern structure consisting of areas which differ in wettability. When spray coating is used, as the liquid composition for forming an optical element is adhered to the substrate in the form of droplets, the droplets adhered to areas having low wettability tend to move into areas having high wettability advantageously. By changing the total amount of the composition sprayed, the height of the finally obtained optical element can be adjusted advantageously.

Dip coating is also preferably used. The above substrate having a pattern film is immersed in a bath of the liquid composition for forming an optical element and pulled up at a predetermined rate so that the above liquid composition is adhered only to the areas having high wettability of the surface of the substrate in the form of droplets. According to circumstances, the liquid composition may be spread over all the areas having high wettability and the areas having low wettability of the surface of the substrate to an almost uniform thickness. In this case, the above liquid composition can be collected in the areas having high wettability of the surface of the substrate by applying vibration or ultrasonic vibration to the substrate or the spread liquid layer, or blowing air to the spread liquid layer. A certain type of liquid composition for forming an optical element, for example, a liquid composition comprising a trialkoxysilane such as phenyltrimethoxysilane, phenyltriethoxysilane, benzyltrimethoxysilane or benzyltriethoxysilane, an acid catalyst, water and a solvent may not collect in the areas having high wettability of the surface of the substrate right after coating when the amounts of the solvent and water are relatively small or when the ratio of the total of the areas having high wettability to the total of the areas having low wettability of the surface of the substrate is large. However, when the substrate is heated at 100 to 300° C. while it is maintained almost horizontal in such a manner that its coated side faces up after the liquid composition is applied and dried for several hours, the coating film which has become solid by drying is softened and molten due to its reduced viscosity and collects in the areas having high wettability of the surface of the substrate. When the coating film is further heated, the film is completely cured by the proceeding of polycondensation and microlens-like small projections made from phenylpolysiloxane or benzylpolysiloxane and firmly adhered to the surface of the substrate are formed in the areas having high wettability. After the liquid composition collects in the areas having high wettability of the surface of the substrate and becomes droplets by the application of the above liquid composition and optionally the subsequent application of vibration, it is heated at 100 to 300° C. for 10 to 300 minutes, whereby hydrolysis and polycondensation reactions proceed, microlens-like transparent solid projections are firmly adhered to the areas having high wettability of the substrate, thereby obtaining a lens or microlens array.

Since light exposed portions and light unexposed portions, the areas which differ from each other in surface energy are formed in the present invention, it is possible to control the shape of the lens by adjusting the difference of surface energy between the light exposed portions and the light unexposed portions. Therefore, the above compound having a water-repellent group may be selected according to a desired shape.

The substrate used in the present invention is preferably a board-like substrate having heat resistance. The warpage of the surface of the substrate (length of thermal deformation in a direction perpendicular to the surface per unit length in the surface direction of the substrate) at 200° C. and 200° C. is desirably ±5 µm or less per 1 cm. When the warpage is above this range, the film may peel off from the substrate at the interface or may crack in the step of molding the film. Therefore, it is preferred to select the material, size and shape of the substrate.

This substrate preferably has a linear expansion coefficient of $1.5 \times 10^{-5}$/° C. or less. When the linear expansion coefficient of the substrate is larger than $1.5 \times 10^{-5}$/° C., the film may peel off from the substrate at the interface or may crack in the step of molding an organopolysiloxane film. The substrate is preferably transparent. Ordinary inorganic glass is preferably used because it has a linear expansion coefficient of $1.5 \times 10^{-5}$/° C. or less. At least the surface of the substrate is preferably made from an oxide. If the surface in contact with the organopolysiloxane film of the substrate is not made from an oxide, adhesion strength will lower in the step of molding a film and the film may peel off from the substrate at the interface. Preferred examples of the material of the substrate include oxide glasses such as silicate-based glass, borosilicate-based glass, quartz and transparent ceramics.

When a transparent object for transmitting radiation having a desired wavelength, such as visible radiation, ultraviolet radiation or infrared radiation, for example, a glass substrate is used as the substrate in the present invention, transmission type optical elements such as a lens, waveguide, diffraction grating and prism can have further functions to be applied jointly.

In the process for producing an optical element of the present invention, the above liquid composition for forming an optical element is applied to the surface of a substrate having a regular pattern consisting of areas which differ in surface energy and heated at a temperature of 100° C. or more to guide the liquid composition for forming an optical element into hydrophilic surface areas having high wettability of the pattern, thereby making it possible to form a desired element accurately.

EXAMPLES

The present invention will be described in detail hereinunder.

Example 1

(1) Preparation of Titanium Oxide Sol and Film Formation 0.1 mol of titanium n-butoxide was diluted with 16 mols of ethanol, the resulting solution was stabilized with 0.1 mol of ethyl acetoacetate, and 0.2 mol of an aqueous solution of nitric acid having a concentration of 0.01 mol/l was added to the above solution and stirred to prepare a titanium oxide sol.

A 25 mm square glass substrate having a thickness of 2.0 mm made from non-alkaline aluminoborosilicate glass was immersed in a bath of the above titanium oxide sol and pulled up at a rate of 1.11 mm/sec to form a titanium oxide sol film on the surface of the glass substrate by dip coating, and then the film was heated at 500° C. for 30 minutes. An anatase type titanium oxide film having a thickness of about 20 nm was formed on the surface of the glass substrate.

(2) Preparation of FAS Sol and Film Formation 0.02 mol of a 0.06 wt % aqueous solution of nitric acid was added to 0.01 mol of heptadecafluorodecyltrimethoxysilane (to be abbreviated as FAS hereinafter) diluted with 2.0 mols of isopropanol and stirred to obtain a FAS sol.

The above titanium oxide film coated glass substrate and the above FAS sol in a flask were placed in a sealed electric furnace and heated at 240° C. for 30 minutes to deposit a FAS film having a thickness of several nm on the titanium oxide film.

(3) Decomposition of FAS by Exposure

A photomask having a matrix pattern of about 20,000 circular openings (light transmitting portions) having a diameter of 150 µm and an interval (between the centers of the openings) of 175 µm was placed on the above glass substrate having the titanium oxide film and FAS film, and the glass substrate was then exposed to 23.0 mW/cm$^2$ of light having a wavelength of 220 to 310 nm and 73.0 mW/cm$^2$ of light having a wavelength of 310 to 390 nm from an extra high pressure mercury lamp (UIS-25102 of Ushio Inc., 250 W, light wavelength of 250 to 450 nm) for 5 minutes to obtain a patterned FAS substrate. In the light exposed portions of the FAS film corresponding to the circular openings of the mask, the fluoroalkyl chain of FAS was decomposed by the function of the titanium oxide photo catalyst contained in the underlying film and vaporized so that FAS turned into hydroxysiloxane or hydroxypolysiloxane. When the contact angles of the light unexposed portions and light exposed portions of the FAS film were measured with a contact angle meter (CA-DT of Kyowa Kaimen Kagaku Co., Ltd.) as contact angles with water and a phenylsilsesquioxane sol to be described hereinafter, they were 108° (water) and 57° (phenylsilsesquioxane sol) in the light unexposed portions and 5° (water) and 30° (phenylsilsesquioxane sol) in the light exposed portions.

(4) Preparation of Phenylsilsesquioxane Sol, Film Formation and Production of Lens Array 1 mol of phenyltriethoxysilane was diluted with 1.5 mols of ethanol, and 4 mols of a 1.44 wt % aqueous solution of hydrochloric acid was added to the above solution and stirred for about 2 hours to hydrolyze and polycondense phenyltriethoxysilane in order to obtain a phenylsilsesquioxane (PhSiO$_{3/2}$) sol.

The above patterned FAS substrate was immersed in a bath of the above phenylsilsesquioxane sol and pulled up at a rate of 3.03 mm/sec to form a phenylsilsesquioxane sol film on the patterned FAS film of the glass substrate by dip coating. The wet thickness of the film was several tens of micrometers. This film was dried at room temperature for about 15 hours to obtain a gel film. The gel film was almost uniform in thickness and spread over the surface of the patterned FAS film and had a thickness of about 2 µm, and this sol lost its fluidity to become gelled and solid by the evaporation of the solvent. When this gelled film was then kept at 200° C., the gel became fluid after the passage of about 10 minutes so that the gel on the light unexposed portions of the FAS film moved and collected on the light exposed portions (150 µm-diameter circular portions) of the FAS film to form projections. When this heating was further continued for 20 minutes, the projections on the light exposed portions of the FAS film were completely gelled and cured to form 120 µm-diameter semispherical lenses made from a phenylsilsesquioxane polymer, thereby obtaining an array of about 20,000 microlenses adhered to the surface of the substrate. The thickness between the top and the bottom of each lens was about 7 µm. The 3-D surface profile of the formed lens array measured with an atomic force microscope (AFM) is shown in FIG. 1. The sectional profile cut at the top of the lens is shown in FIG. 2.

When thickness variations among the formed lenses were evaluated at 5 points, they were 7±0.5 µm and the error was about ±7.1%. When the focusing distances of the lenses were measured, they were 425±25 µm and the error was ±5.9%. Further, when the transmission for light having a wavelength of 400 to 2,500 nm of this material was evaluated, it was confirmed that there was no absorption at a communication wavelength. The lenses had such high adhesion to the substrate that they did not peel off from the substrate at the time of cutting the peripheral portion of the substrate and rinsing.

After a heat resistance test was made on the above microlens array by keeping it at 300° C. for 2 hours, the temperature was returned to room temperature to observe whether the microlens array cracked or not in order to evaluate its heat resistance. As a result, the lenses and the substrate did not crack nor peel off and the focusing distances of all the lenses remained unchanged after the heat resistance test.

Example 2

Preparation of Benzylsilsesquioxane Sol, Film Formation and Molding of Lens Array 1 mol of benzyltriethoxysilane was diluted with 1.5 mols of ethanol, and 4 mols of a 1.44 wt % aqueous solution of hydrochloric acid was added to the above solution and stirred for about 2 hours to hydrolyze and polycondense benzyltriethoxysilane in order to obtain a benzylsilsesquioxane ($BzSiO_{3/2}$) sol.

A film was formed from the above benzylsilsesquioxane sol on a non-alkaline glass substrate having a FAS pattern by dip coating at a pull-up rate of 3.03 mm/sec in the same manner as in Example 1 and then dried at room temperature for about 15 hours. When this gel film was heated at 200° C. for 30 minutes, it became soft and collected on the light exposed portions (150 µm-diameter circles) of the FAS film as in Example 1 to form projections which were then completely gelled and cured to form 120 µm-diameter semispherical lenses made from a benzylsilsesquioxane polymer, thereby obtaining an array of about 20,000 microlenses adhered to the surface of the substrate. The thickness between the top and the bottom of each lens was about 7 µm.

When thickness variations among the formed lenses were evaluated at 5 points, they were 7±0.3 µm and the error was about ±4.3%. When the focusing distances of the lenses were measured, they were 425±20 µm and the error was ±4.7%. When the transmission for light having a wavelength of 400 to 2,500 nm of this material was evaluated, it was confirmed that there was no absorption at a communication wavelength. The lenses had such high adhesion to the substrate that they did not peel off from the substrate at the time of cutting and rinsing. As for evaluation results after a heat resistance test, the lenses and the substrate did not crack nor peel off and the focusing distances of all the lenses remained unchanged after the heat resistance test.

Example 3

A solution prepared by diluting the benzylsilsesquioxane sol used in Example 2 with ethanol to 2 times was used as a lens forming material to form a film on a non-alkaline glass substrate having a FAS pattern by dip coating at a pull-up rate of 3.03 mm/sec in the same manner as in Example 1. The solution collected on the light exposed portions (150 µm-diameter circles) of the FAS film to form projections. Thereafter, the projections were dried at room temperature for 15 hours and further heated at 200° C. for 30 minutes to be completely cured. As a result, semispherical lenses having a diameter of 120 µm were formed, thus obtaining an array of about 20,000 microlenses adhered to the surface of the substrate. The thickness between the top and the bottom of each lens was about 3.3 µm.

When thickness variations among the lenses was evaluated at 5 points, they were 3.3±0.2 µm and the error was ±6.1%. When the focusing distances were measured, they were 891±65 µm and the error was ±7.3%. Further, when the transmission for light having a wavelength of 400 nm to 2,500 nm of this material was evaluated, it was confirmed that there was no absorption at a communication wavelength. The lenses had such high adhesion to the substrate that they did not peel off from the substrate at the time of cutting and rinsing. As for evaluation results after a durability test, the lenses and the substrate did not crack nor peel off, and the focusing distances of all the lenses remained unchanged after the heat resistance test.

Example 4

9.5 g of tetraethoxysilane and 0.26 g of heptadecafluorodecyl trimethoxysilane were added to 81.2 g of ethanol and stirred for 20 minutes, 4.04 g of water and 5.0 g of 0.1 N hydrochloric acid were added to the above solution and stirred for 2 hours. Then, this solution was placed in a sealed container and left at 25° C. for 10 days to obtain a solution. This solution was diluted with ethanol to 5 times to obtain a water-repellent solution.

10 g of the above water-repellent solution and 0.09 g of titanium oxide fine particles ($TiO_2$ fine particles, average particle diameter of 7 nm, STS-01 titanium oxide fine particle photo catalyst of Ishihara Sangyo Co., Ltd.) were mixed together to prepare a coating solution. This coating solution was applied to a glass substrate by flow coating and then dried at 21° C. in a drying chamber and then at 120° C. in the air for 20 minutes. Further, a photomask having a matrix pattern of about 20,000 circular openings having a diameter of 150 µm and an interval of 175 µm was placed on the above glass substrate having the titanium oxide film and FAS-containing film and exposed at the same intensity as in Example 1 using the same extra high pressure mercury lamp as in Example 1 for 5 minutes to decompose the fluoroalkyl chain of FAS in the light exposed portions by the photo catalystic function. When the contact angles of the light exposed portions with water and a benzylsilsesquioxane sol to be described hereinafter were measured, they were 105° (water) and 60° (benzylsilsesquioxane sol) in the light unexposed portions and 4° (water) and 32° (benzylsilsesquioxane sol) in the light exposed portions.

A film was formed from the benzylsilsesquioxane sol prepared in Example 2 by dip coating at a pull-up rate of 3.03 mm/sec in the same manner as in Example 1 and dried at room temperature for about 15 hours to obtain a gel film. This gel film was uniform in thickness and spread over the surface of the pattern FAS film. By the evaporation of the solvent, this sol lost its fluidity to become gelled and solid. When this gelled film was kept at 200° C., this gel became fluid after the passage of about 10 minutes so that the gel on the light unexposed portions of the FAS film moved and collected on the light exposed portions (150 μm-diameter circles) of the FAS film to form projections. When this heating was further continued for 20 minutes, the projections on the exposed portions of the FAS film were completely gelled and cured to form 120 μm-diameter semispherical lenses, thereby obtaining an array of about 20,000 microlenses adhered to the surface of the substrate. The thickness between the top and the bottom of each lens was about 7 μm.

When thickness variations among the formed lenses were evaluated at 5 points, they were 7±0.3 μm and the error was ±4.3%. When the focusing distances of the formed lenses were measured, they were 430±21 μm and the error was ±4.9%. Further, when the transmission for light having a wavelength of 400 to 2,500 nm of this material was evaluated, it was confirmed that there was no absorption at a communication wavelength. The lenses had such high adhesion to the substrate that they did not peel off from the substrate at the time of cutting and rinsing. After a heat resistance test was made on the above microlenses by keeping them at 300° C. for 2 hours, the temperature was returned to room temperature to observe whether they cracked or not in order to evaluate their heat resistance. As a result, the lenses and the substrate did not crack nor peel off and the focusing distances of all the lenses remained unchanged after the heat resistance test.

In this Example 4, after a water-repellent material such as FAS is applied to the photo catalyst active layer, it is exposed to form a pattern consisting of light exposed portions and light unexposed portions, thereby producing lenses, making use of a difference in surface energy among the light exposed portion, the light unexposed portions and the lens forming material containing a hydrolyzable compound which can be hydrolyzed and polycondensed. When a specific lens forming material is used, a film uniform in thickness is formed from the material, dried and heated so that the lens forming material which has been solid becomes droplets, whereby the surface energy of the material increases and lenses are thereby formed.

Example 5

Preparation of Phenylsilsesquioxane Sol Containing Titanium, Film Formation and Formation of Lens Array 0.95 mol of phenyltriethoxysilane was diluted with 1 mol of ethanol, and 4 mols of a 1.44 wt % aqueous solution of hydrogen chloride was added to the above solution and stirred for about 30 minutes. 0.05 mol of a titanium-ethyl acetoacetate complex was added to the resulting solution and further stirred for about 30 minutes to obtain a phenylsilsesquioxane sol containing titanium.

Example 6

Preparation of Phenylsilsesquioxane Sol Containing Titanium, Film Formation and Formation of Lens Array 0.45 mol of phenyltriethoxysilane and 0.45 mol of diphenyldiethoxysilane were diluted with 1 mol of ethanol, and 4 mols of a 1.44 wt % aqueous solution of hydrogen chloride was added to the above solution and stirred for about 30 minutes. 0.10 mol of a titanium-ethyl acetoacetate complex was added to the resulting solution and further stirred for about 30 minutes to obtain a phenylsilsesquioxane sol containing titanium.

Example 7

Preparation of Phenylsilsesquioxane Sol Containing Methylsilsesquioxane, Film Formation and Formation of Lens Array 0.60 mol of phenyltriethoxysilane and 0.40 mol of methyltriethoxysilane were diluted with 1.5 mols of ethanol, and 4 mols of a 1.44 wt % aqueous solution of hydrogen chloride was added to the above solution and stirred for about 30 minutes to obtain a phenylsilsesquioxane sol containing methylsilsesquioxane.

The sols obtained in Examples 5 to 7 were coated, dried and heated at 200° C. in the same manner as in Example 1 to form semispherical lenses. The materials and refractive indices of the formed lenses are shown in Table 1. The refractive index of the lenses produced in Example 1 was 1.53 and Examples 5 to 7 show that the control of refractive index is possible.

TABLE 1

| Ex. No. | Material of lens | refractive index of lens |
| --- | --- | --- |
| 5 | Phenyl group-containing silicon oxide-titanium oxide polymer | 1.55 |
| 6 | Phenyl group-containing silicon oxide-titanium oxide polymer | 1.58 |
| 7 | Silicon oxide polymer containing methyl group and phenyl group | 1.50 |

Ex.: Example

As described above, according to the present invention, there are obtained a microlens array having excellent heat resistance and adhesion to a substrate and other optical elements.

What is claimed is:

1. A process for producing an optical element comprising the steps of:
   adhering a liquid composition for forming an optical element to the molding surface of a substrate having a regular pattern surface consisting of areas having high wettability and areas having low wettability as the molding surface; and
   curing the composition to form projections in the areas having high wettability, wherein
   a solution containing at least one compound selected from the group consisting of a hydrolyzable compound which can be hydrolyzed/polycondensed and a hydrolyzed/polycondensed product thereof is used as the liquid composition for forming an optical element.

2. The process of claim 1, wherein the hydrolyzable compound is an alkoxide or a chelate compound of at least one element selected from the group consisting of silicon, aluminum, zirconium, titanium, tin and antimony.

3. The process of claim 2, wherein the adhering is carried out by applying the liquid composition to the entire molding surface of the substrate and heating it at 100 to 300° C. to collect the liquid composition in the areas having high wettability.

4. The process of claim 2, wherein the pattern of the molding surface of the substrate is produced by forming a layer of an oxide having photo catalytic activity and a light transmitting layer of a compound having a water-repellent group which is decomposable by a photo catalystic function on the surface of the substrate and exposing light to them through a photomask.

5. The process of claim 2, wherein the pattern of the molding surface of the substrate is produced by forming a layer containing an oxide having photo catalytic activity and a compound having a water-repellent group which is decomposable by a photo catalystic function and then exposing light to it through a photomask.

6. The process of claim 1, wherein the solution contains a silicon compound represented by the following formula (1) as the hydrolyzable compound:

$$Y_nSiX_{4-n} \quad (1)$$

wherein Y is an alkyl group, vinyl group, amino group, epoxy group, phenyl group or benzyl group, X's are each independently a halogen atom or alkoxyl group, and n is 0 or 1,
or a hydrolyzed/polycondensed product thereof.

7. The process of claim 6, wherein in the formula (1), Y is a phenyl group or benzyl group, X is a methoxyl group or ethoxyl group, and n is 1.

8. The process of claim 7, wherein the solution contains at least one metal compound selected from the group consisting of titanium alkoxide, zirconium alkoxide, aluminum alkoxide and chelate compounds thereof as the hydrolysable compound, or a hydrolyzed/polycondensed product thereof, in addition to the above silicon compound of formula (1).

9. The process of claim 7, wherein the solution contains a silicon compound represented by the following formula (2) as the hydrolysable compound:

$$R_2SiQ_2 \quad (2)$$

wherein R's are each independently an alkyl group, vinyl group, amino group, epoxy group, phenyl group or benzyl group, and Q's are each independently a halogen atom or alkoxyl group, or a hydrolyzedipolycondensed product thereof, in addition to the silicon compound of formula (1).

10. The process of claim 7, wherein the adhering is carried out by applying the liquid composition to the entire molding surface of the substrate and heating it at 100 to 300° C. to collect the liquid composition in the areas having high wettability.

11. The process of claim 7, wherein the pattern of the molding surface of the substrate is produced by forming a layer of an oxide having photo catalytic activity and a light transmitting layer of a compound having a water-repellent group which is decomposable by a photo catalystic function on the surface of the substrate and exposing light to them through a photomask.

12. The process of claim 7, wherein the pattern of the molding surface of the substrate is produced by forming a layer containing an oxide having photo catalytic activity and a compound having a water-repellent group which is decomposable by a photo catalystic function and then exposing light to it through a photomask.

13. The process of claim 6, wherein the solution contains at least one metal compound selected from the group consisting of titanium alkoxide, zirconium alkoxide, aluminum alkoxide and chelate compounds thereof as the hydrolysable compound, or a hydrolyzed/polycondensed product thereof, in addition to the silicon compound of formula (1).

14. The process of claim 13, wherein the at least one compound is contained in an amount of 30 mol % or less in terms of silicon and metal element based on 100 mol % of the total of silicon and metal element contained in the liquid composition for forming an optical element.

15. The process of claim 14, wherein the solution contains a silicon compound represented by the following formula (2) as the hydrolysable compound:

$$R_2SiQ_2 \quad (2)$$

wherein R's are each independently an alkyl group, vinyl group, amino group, epoxy group, phenyl group or benzyl group, and Q's are each independently a halogen atom or alkoxyl group, or a hydrolyzed/polycondensed product thereof, in addition to the silicon compound of formula (1).

16. The process of claim 14, wherein the adhering is carried out by applying the liquid composition to the entire molding surface of the substrate and heating it at 100 to 300° C. to collect the liquid composition in the areas having high wettability.

17. The process of claim 14, wherein the pattern of the molding surface of the substrate is produced by forming a layer of an oxide having photo catalytic activity and a light transmitting layer of a compound having a water-repellent group which is decomposable by a photo catalystic function on the surface of the substrate and exposing light to them through a photomask.

18. The process of claim 14, wherein the pattern of the molding surface of the substrate is produced by forming a layer containing an oxide having photo catalytic activity and a compound having a water-repellent group which is decomposable by a photo catalystic function and then exposing light to it through a photomask.

19. The process of claim 13, wherein the solution contains a silicon compound represented by the following formula (2) as the hydrolysable compound:

$$R_2SiQ_2 \quad (2)$$

wherein R's are each independently an alkyl group, vinyl group, amino group, epoxy group, phenyl group or benzyl group, and Q's are each independently a halogen atom or alkoxyl group, or a hydrolyzed/polycondensed product thereof, in addition to the silicon compound of formula (1).

20. The process of claim 13, wherein the adhering is carried out by applying the liquid composition to the entire molding surface of the substrate and heating it at 100 to 300° C. to collect the liquid composition in the areas having high wettability.

21. The process of claim 13, wherein the pattern of the molding surface of the substrate is produced by forming a layer of an oxide having photo catalytic activity and a light transmitting layer of a compound having a water-repellent group which is decomposable by a photo catalystic function on the surface of the substrate and exposing light to them through a photomask.

22. The process of claim 13, wherein the pattern of the molding surface of the substrate is produced by forming a layer containing an oxide having photo catalytic activity and a compound having a water-repellent group which is decomposable by a photo catalystic function and then exposing light to it through a photomask.

23. The process of claim 6, wherein the solution contains a silicon compound represented by the following formula (2) as the hydrolysable compound:

$$R_2SiQ_2 \quad (2)$$

wherein R's are each independently an alkyl group, vinyl group, amino group, epoxy group, phenyl group or benzyl group, and Q's are each independently a halogen atom or alkoxyl group, or a hydrolyzedlpolycondensed product thereof, in addition to the silicon compound of formula (1).

24. The process of claim 23, wherein in the formula (2), R is a phenyl group or methyl group and Q is a methoxyl group or ethoxyl group.

25. The process of claim 24, wherein the silicon compound represented by the above formula (2) or a hydrolyzed/polycondensed product thereof is contained in an amount of 50 mol % or less in terms of silicon based on 100 mol % of the total of silicon and metal element contained in the liquid composition for forming an optical element.

26. The process of claim 24, wherein the adhering is carried out by applying the liquid composition to the entire molding surface of the substrate and heating it at 100 to 300° C. to collect the liquid composition in the areas having high wettability.

27. The process of claim 24, wherein the pattern of the molding surface of the substrate is produced by forming a layer of an oxide having photo catalytic activity and a light transmitting layer of a compound having a water-repellent group which is decomposable by a photo catalystic function on the surface of the substrate and exposing light to them through a photomask.

28. The process of claim 24, wherein the pattern of the molding surface of the substrate is produced by forming a layer containing an oxide having photo catalytic activity and a compound having a water-repellent group which is decomposable by a photo catalystic function and then exposing light to it through a photomask.

29. The process of claim 23, wherein the silicon compound represented by the above formula (2) or a hydrolyzed/polycondensed product thereof is contained in an amount of 50 mol % or less in terms of silicon based on 100 mol % of the total of silicon and metal element contained in the liquid composition for forming an optical element.

30. The process of claim 29, wherein the adhering is carried out by applying the liquid composition to the entire molding surface of the substrate and heating it at 100 to 300° C. to collect the liquid composition in the areas having high wettability.

31. The process of claim 29, wherein the pattern of the molding surface of the substrate is produced by forming a layer of an oxide having photo catalytic activity and a light transmitting layer of a compound having a water-repellent group which is decomposable by a photo catalystic function on the surface of the substrate and exposing light to them through a photomask.

32. The process of claim 29, wherein the pattern of the molding surface of the substrate is produced by forming a layer containing an oxide having photo catalytic activity and a compound having a water-repellent group which is decomposable by a photo catalystic function and then exposing light to it through a photomask.

33. The process of claim 23, wherein the adhering is carried out by applying the liquid composition to the entire molding surface of the substrate and heating it at 100 to 300° C. to collect the liquid composition in the areas having high wettability.

34. The process of claim 23, wherein the pattern of the molding surface of the substrate is produced by forming a layer of an oxide having photo catalytic activity and a light transmitting layer of a compound having a water-repellent group which is decomposable by a photo catalystic function on the surface of the substrate and exposing light to them through a photomask.

35. The process of claim 23, wherein the pattern of the molding surface of the substrate is produced by forming a layer containing an oxide having photo catalytic activity and a compound having a water-repellent group which is decomposable by a photo catalystic function and then exposing light to it through a photomask.

36. The process of claim 6, wherein the adhering is carried out by applying the liquid composition to the entire molding surface of the substrate and heating it at 100 to 300° C. to collect the liquid composition in the areas having high wettability.

37. The process of claim 6, wherein the pattern of the molding surface of the substrate is produced by forming a layer of an oxide having photo catalytic activity and a light transmitting layer of a compound having a water-repellent group which is decomposable by a photo catalystic function on the surface of the substrate and exposing light to them through a photomask.

38. The process of claim 6, wherein the pattern of the molding surface of the substrate is produced by forming a layer containing an oxide having photo catalytic activity and a compound having a water-repellent group which is decomposable by a photo catalystic function and then exposing light to it through a photomask.

39. The process of claim 1, wherein the adhering is carried out by applying the liquid composition to the entire molding surface of the substrate and heating it at 100 to 300° C. to collect the liquid composition in the areas having high wettability.

40. The process of claim 39, wherein the pattern of the molding surface of the substrate is produced by forming a layer of an oxide having photo catalytic activity and a light transmitting layer of a compound having a water-repellent group which is decomposable by a photo catalystic function on the surface of the substrate and exposing light to them through a photomask.

41. The process of claim 39, wherein the pattern of the molding surface of the substrate is produced by forming a layer containing an oxide having photo catalytic activity and a compound having a water-repellent group which is decomposable by a photo catalystic function and then exposing light to it through a photomask.

42. The process of claim 1, wherein the pattern of the molding surface of the substrate is produced by forming a layer of an oxide having photo catalytic activity and a light transmitting layer of a compound having a water-repellent group which is decomposable by a photo catalystic function on the surface of the substrate and exposing light to them through a photomask.

43. The process for producing an optical element of claim 42, wherein the oxide having photo catalytic activity is titanium oxide and the compound having a water-repellent group is a fluoroalkyltrialkoxysilane or a hydrolyzed/polycondensed product thereof.

44. The process of claim 1, wherein the pattern of the molding surface of the substrate is produced by forming a layer containing an oxide having photo catalytic activity and a compound having a water-repellent group which is decomposable by a photo catalystic function and then exposing light to it through a photomask.

45. The process for producing an optical element of claim 44, wherein the oxide having photo catalytic activity is titanium oxide and the compound having a water-repellent group is a fluoroalkyltrialkoxysilane or a hydrolyzedlpolycondensed product thereof.

* * * * *